Dec. 7, 1943. R. A. LITSCHERT 2,336,107
MOUNTING FOR TELESCOPE SIGHTS FOR GUNS
Filed March 17, 1942
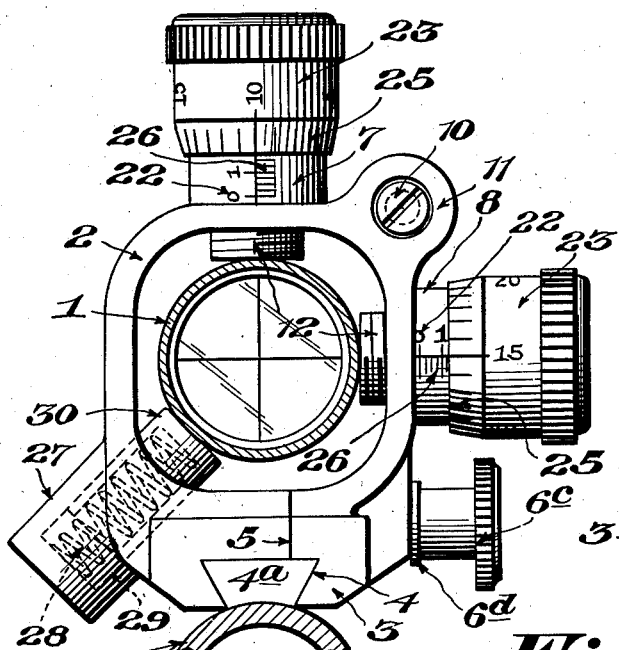
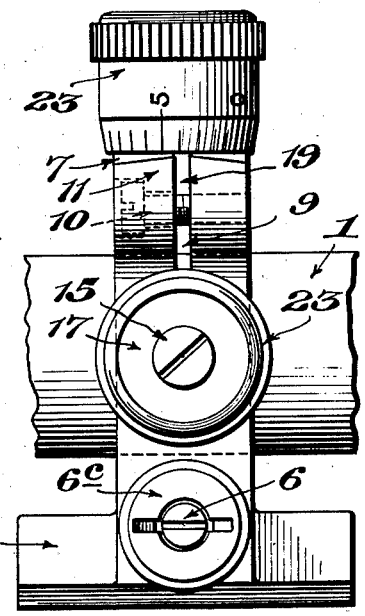
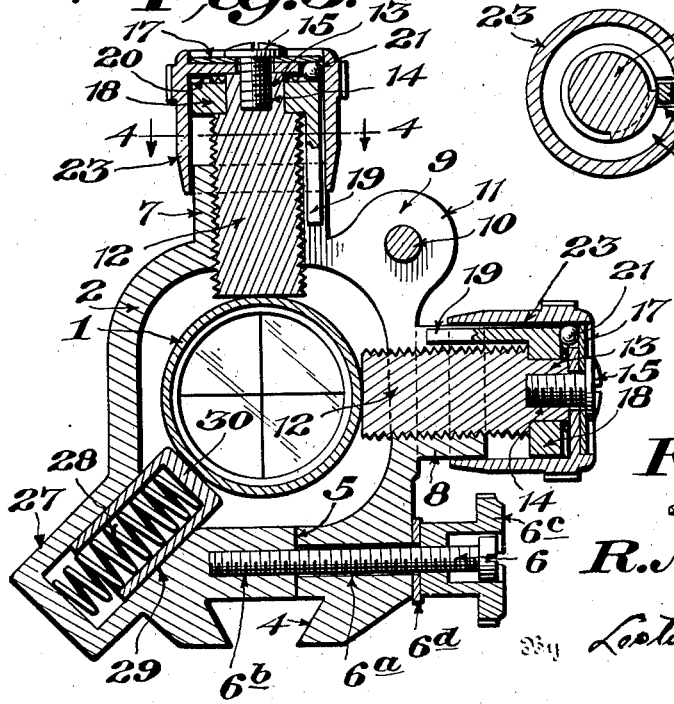
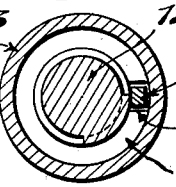
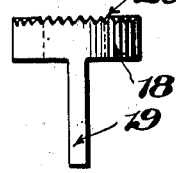
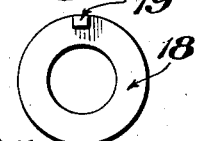
Inventor
R. A. Litschert, Patented Dec. 7, 1943

2,336,107

UNITED STATES PATENT OFFICE 2,336,107

MOUNTING FOR TELESCOPE SIGHTS FOR GUNS

Ralph A. Litschert, Winchester, Ind.

Application March 17, 1942, Serial No. 435,105

4 Claims. (Cl. 33—50)

My invention relates to a rear telescopic sight mount having improved means for attaching the device to the gun and also having improved means for adjustment of the telescope in the mounting.

It is also an object of my invention to provide means for very accurate adjustment of the sight in the mounting.

It is also an object of my invention to use a flat spring and a ball bearing in the cap to make a smooth adjustment and prevent wear.

I attain these and other objects of my invention by the mechanism illustrated in the accompanying drawing, in which—

Figure 1 is a front elevation of the invention; with the telescope and a portion of the gun shown in section;

Fig. 2 is a side elevation of the invention;

Fig. 3 is a vertical section through the invention and through the telescope;

Fig. 4 is a section on line 4—4 of Fig. 3;

Fig. 5 is a side elevation of notched ring;

Fig. 6 is a bottom plan view of same; and

Fig. 7 is a detail view of the flat spring detached.

Like characters of reference designate like parts in each of the several views.

Referring to the accompanying drawing, I provide a telescopic sight 1 of any suitable design. The mount comprises a frame 2 mounted in spaced relation to and extending around the telescope, as shown in Figs. 1 and 3, and, having a clamping element or base 3, which has an angular recess 4 extending longitudinally through it, whereby the frame may be clamped on the projection or block 4ª on a gun barrel 4ᵇ. The base of the mount 3 has a vertical slot 5 extending through it, as shown in Fig. 1. A transverse clamping screw 6ᶜ is loosely mounted in the channel 6ª of the portion of the frame at the right of the slot 5 and has a screw-threaded engagement at 6ᵇ with the portion of the frame 2 at the left of the vertical slot 5. The screw 6ᶜ includes a suitable knob which contacts with a washer 6ᵈ interposed between the knob and the frame 2, as shown in Fig. 3.

The frame 2 has a top hollow cylindrical projection 7 and a similar lateral hollow cylindrical projection 8 said projections preferably being integral with the frame 2 and disposed with their axes in planes at an approximately 90° angle to each other. A narrow central slot 9 extends from one side of the top of cylindrical projection 7 through the adjacent portion of the frame to and through one side of the lateral cylindrical projection 8. An adjustment screw 10 extends through the portion of the frame in which projection 11 is positioned.

Telescope adjustment members or cylinders 12, having exterior threaded engagement with the inner cylindrical walls of projections 7 and 8 and of the frame 2, as shown in Fig. 3, are provided for adjusting the position of the telescope sight. Members 12 each have a cylindrical extension 13 of reduced diameter; and member 13 has a central threaded recess 14 adapted to have a threaded engagement with screw 15, which holds the adjustment cap 16 rotatably mounted over the end of cylindrical extension 13, as shown in Fig. 3, by its engagement with a slightly conical spring plate 17.

Mounted on the scope adjustment cylinder 12 and seated around the reduced cylindrical extension 13 of same is a collar 18 having a finger 19 affixed to or integral with and depending from the collar and extending into the slot 9 of the frame 2, as shown in Fig. 2. Collar 18 has its upper surface annularly notched at 20, as shown in Fig. 5. A single ball bearing 21 is provided, which is inserted through the aperture in each of the caps 23. Cap 23 encloses the ring 18 and ball bearing 21. Caps 23 are each provided with a knurled annular exterior portion 24 for convenience in rotating the cap.

The caps 23 each have annularly disposed gauge markings 25; while the members 7 and 8 each have gauge markings 26 extending radially, on said members. The frame 2 has a cylindrical hollow extension 27 in which is contained a spring 28, and a slidably mounted hollow cylinder 29, which has its outer end 30 in resilient engagement with the telescope sight 1, as shown in Fig. 3.

The method of adjustment will be apparent from the drawing. By splitting the lower section of the frame at 5, where the base clamps on the gun barrel, a stronger and more rigid contact is made as the entire length of the base of the frame 2 clamps on the projection or block 4ª of the gun barrel 4ᵇ.

There is no danger of breaking or chipping the clamp screw as in other types of mounts, where the clamp screw contacts the base. The mount will fit all types of scope bases equally well, due to the adjustment allowed in providing the slit 5 and clamping screw 6ᶜ by which the frame is secured to the gun.

The steel ball 21 is used to contact the graduated notches 20 of the collar to make the clicks. This makes a smooth adjustment and the steel ball 21 will not wear the graduations 20 of the collar 18, and will not lose the effect of the click, which is a result that occurs in mounts using a sharp pointed contact point. By using the flat spring 17 in place of a coil spring, the cap 23 can be made shorter and thus makes it more secure against being put out of adjustment by contact with other hard substances.

The click assembly is held together by the large screw 15, which renders it easy to take the device apart and repair and adjust same. The important advantage of the construction is that the screw may be slightly loosened and the adjustment may be set on zero without affecting the adjustment of the telescope 1 on the gun barrel 4b. Thereafter, in adjusting, the screw should be tightened. This feature is original with my invention.

The bearing surfaces of the screw construction against the telescope tube 1 can be made greater in diameter, giving a more secure bearing against the telescope tube, and giving more accurate adjustment. This is accomplished by using the construction described and shown. The larger bearing surfaces which I obtain cannot be had by the form of constructions shown in the prior art.

My frame may be used on any standard make of block or base on the gun, and the entire length of the base 3 is clamped against the base or block 4a of the gun. In my form of construction the screw 6c does not come in contact with the member 4 of the gun, and thereby prevents the screw from becoming loose or chipping from wear or recoil of the gun. This is also an original and important feature.

In devices of this type it is usual to provide a clicking device to indicate audibly the extent of turning of the caps 23. In my invention this device consists of the notched surface 20 of the collar 18, the ball 21 and the slightly concave-shaped spring 17 which presses on the ball. As either of the caps 23 is turned a series of clicks will be made, corresponding in number to the extent of the turning movement of the particular cap relative to that of the cylindrical projections 7 or 8 as the case may be, and hence to the extent of the movement of the telescope. This can be visually noted by the measurement markings 26, as shown in Fig. 1.

What I claim is:

1. In a mounting for telescope gun sights, the combination of a frame loosely surrounding the telescope, said frame having normally vertical and lateral screw-threaded projections, rotatable telescope-engaging-adjusting members threaded in the respective projections, a collar rotatably mounted upon the outer end of each member, means attached to said collars and engaging said frame to limit said collars to sliding along the respective projections, a cap fixed to the outer end of each member and having a skirt portion projecting over the respective collars and projections, a ball between the cap and notched collar, means constraining the ball to rotate with said cap over the notches of said collar, and means resiliently urging said ball into said notches.

2. In combination with the device defined in claim 1, said frame surrounding the telescope having a longitudinal slot extending from one side of one screw-threaded projection to the adjacent side of the other screw-threaded projection to receive the finger of the notched collar, and means mounted in the frame for drawing the sides of the slot together.

3. In a mounting for telescopic gun sights, the combination of a frame loosely surrounding the telescope, said frame having normally vertical and lateral screw-threaded projections, rotatable telescope-engaging-adjusting members threaded in the respective projections, a notched collar rotatably mounted upon the outer ends of each member, each collar having an inwardly extending finger to limit said collars to sliding along the respective projections, a cap fixed to the outer end of each member and having a skirt portion projecting over the said collars and projections, a ball between the cap and notched collar, means constraining said ball to rotate with said cap over the notches of said collar, and a normally cone-shaped spring plate seated over the ball and urging said ball into said notches.

4. In a mounting for telescope gun sights, the combination of a frame loosely surrounding the telescope, said frame having normally vertical and lateral screw-threaded projections, rotatable telescope-engaging-adjusting members threaded in the respective projections, said telescope-engaging-adjusting members each having a reduced extended end, a collar rotatably seated on each of said reduced extended ends and slidably mounted in the frame, said collars each having an integral finger engaging said frame to limit said collars to sliding along the respective projections, a cap fixed to the outer end of said adjusting members and having a skirt portion projecting over the respective collars and projections, a ball between the cap and notched collar, and a normally cone-shaped spring plate resiliently urging said ball into said notches.

RALPH A. LITSCHERT.